United States Patent
Sasaki et al.

(10) Patent No.: US 7,365,942 B2
(45) Date of Patent: Apr. 29, 2008

(54) THIN-FILM MAGNETIC HEAD

(75) Inventors: Yoshitaka Sasaki, Milpitas, CA (US); Hiroyuki Itoh, Milpitas, CA (US); Takehiro Kamigama, Hong Kong (CN); Tatsushi Shimizu, Hong Kong (CN)

(73) Assignees: Headway Technologies, Inc., Milpitas, CA (US); SAE Magnetics (H.K.) Ltd., Shatin (HK)

( * ) Notice: Subject to any disclaimer, the term of this patent is extended or adjusted under 35 U.S.C. 154(b) by 338 days.

(21) Appl. No.: 11/158,103

(22) Filed: Jun. 22, 2005

(65) Prior Publication Data

US 2006/0291096 A1 Dec. 28, 2006

(51) Int. Cl.
*G11B 5/31* (2006.01)
*G11B 5/187* (2006.01)
*G11B 5/127* (2006.01)

(52) U.S. Cl. .................. 360/126; 360/119; 360/122
(58) Field of Classification Search ................ 360/119, 360/122, 125, 126
See application file for complete search history.

(56) References Cited

U.S. PATENT DOCUMENTS

| | | | |
|---|---|---|---|
| 4,656,546 A | 4/1987 | Mallory | |
| 4,672,493 A | 6/1987 | Schewe | |
| 6,504,675 B1 | 1/2003 | Shukh et al. | |
| 6,791,793 B1* | 9/2004 | Chen et al. | 360/126 |
| 7,009,812 B2* | 3/2006 | Hsu et al. | 360/126 |
| 7,120,988 B2* | 10/2006 | Le et al. | 29/603.07 |
| 7,193,815 B1* | 3/2007 | Stoev et al. | 360/126 |
| 2003/0117749 A1* | 6/2003 | Shukh et al. | 360/317 |
| 2003/0227714 A1* | 12/2003 | Parker et al. | 360/125 |
| 2004/0201918 A1* | 10/2004 | Guan et al. | 360/125 |
| 2005/0013044 A1* | 1/2005 | Hirata et al. | 360/125 |
| 2005/0128637 A1* | 6/2005 | Johnston et al. | 360/125 |
| 2005/0237665 A1* | 10/2005 | Guan et al. | 360/125 |
| 2005/0280939 A1* | 12/2005 | Sasaki et al. | 360/126 |
| 2006/0002021 A1* | 1/2006 | Li et al. | 360/126 |
| 2006/0044677 A1* | 3/2006 | Li et al. | 360/122 |
| 2006/0245108 A1* | 11/2006 | Hsu et al. | 360/125 |

FOREIGN PATENT DOCUMENTS

| | | | |
|---|---|---|---|
| JP | 2003-203311 | | 7/2003 |
| JP | 2003-242607 | | 8/2003 |
| JP | 2004-94997 | | 3/2004 |
| JP | 2004348928 A | * | 12/2004 |
| JP | 2005108412 A | * | 4/2005 |
| JP | 2005122887 A | * | 5/2005 |

OTHER PUBLICATIONS

U.S. Appl. No. 11/134,447, filed May 23, 2005, Sasaki et al.
U.S. Appl. No. 11/110,743, filed Apr. 21, 2005, Sasaki et al.

* cited by examiner

*Primary Examiner*—William J Klimowicz
(74) *Attorney, Agent, or Firm*—Oblon, Spivak, McClelland, Maier & Neustadt, P.C.

(57) ABSTRACT

A thin-film magnetic head for perpendicular magnetic recording comprises a coil, a main magnetic pole layer for performing perpendicular recording, a write shield layer and a write gap layer, wherein the main magnetic pole layer comprises a main pole film portion and a yoke pole film portion. The write shield layer has a first shield film portion for determining a throat height, and the thickness of the first shield layer is smaller than the thickness of the yoke pole film portion.

7 Claims, 11 Drawing Sheets

7  15  13  9  11  37  33

15  13  9  7  11  37  33

THIN-FILM MAGNETIC HEAD

BACKGROUND OF THE INVENTION

1. Field of the Invention

The present invention relates to a thin-film magnetic head for perpendicular magnetic recording used for recording information on a recording medium by means of a perpendicular magnetic recording method.

2. Description of the Related Art

In recent years, the surface recording density of a magnetic disk device has been remarkably improved. In particular recently, the surface recording density of a magnetic disk device has reached 160 to 200 gigabytes/platter, and furthermore is so vigorous as to exceed such a recording density. With this, the improvement in performance of a thin-film magnetic head is demanded.

Thin-film magnetic heads can be classified roughly into a magnetic head of a longitudinal recording method for recording information in a longitudinal direction in the recording surface of a magnetic disk and a magnetic head of a perpendicular recording method for recording information in the perpendicular direction to the recording surface of it according to their recording methods. Between them, a thin-film magnetic head of a perpendicular recording method is conceived to be more hopeful than that of a longitudinal recording method since a thin-film magnetic head of the perpendicular recording method can realize much higher recording density in comparison with a thin-film magnetic head of the longitudinal recording method and moreover a recorded magnetic disk of the perpendicular recording method is more difficult to suffer from the influence of thermal fluctuation. A thin-film magnetic head of a conventional perpendicular recording method has been disclosed for example in U.S. Pat. No. 6,504,675 Specification, U.S. Pat. No. 4,656,546 Specification, U.S. Pat. No. 4,672,493 Specification, and Japanese Patent Laid Open Publication No. 2004-94,997 and the like.

By the way, in a thin-film magnetic head of a perpendicular recording method, when data are recorded on an inner or outer circumferential region of a magnetic disk, a magnetic pole end portion located at the medium facing surface (referred to as an air bearing surface or ABS also) facing the magnetic disk has a skew angle of a certain angle to a track to have data recorded on it.

In case of a perpendicular magnetic recording head having a high writing ability, there may occur a problem called a writing blur resulting in recording extra data between adjacent tracks due to such a skew angle. The occurrence of such a writing blur has a harmful influence on the detection of a servo signal or the S/N ratio of reproduced waveform. Thereupon, in a conventional perpendicular magnetic recording (PMR) head, a magnetic pole end portion at the ABS side in a main magnetic pole film is made into a bevel shape becoming gradually narrower in one direction (see Japanese Patent Laid Open Publication No. 2003-242,607 and Japanese Patent Laid Open Publication No. 2003-203,311).

As a PMR head having a magnetic pole end portion of a bevel shape, there is known a PMR head provided with a lower yoke layer, a main magnetic pole film having a bevel-shaped magnetic pole end portion, and a write shield layer facing the main pole film with a recording gap film between them at the ABS side. A PMR head of this type is also demanded to be narrower in track width in order to improve the recording density. Furthermore it is desirable to be good in overwrite characteristic and prevent other data from being overwritten on data recorded on a magnetic disk. For this, it is desirable to make a structure in which the lower yoke film is as close to the ABS as possible.

In a PMR head of this type, however, since a main magnetic pole film is formed next to the lower yoke film, a neck height is generated by the influence received by the lower yoke film when the main magnetic pole film having a bevel-shaped magnetic pole end portion is formed, and thereby a narrow part corresponding to a track width is lengthened by the neck height portion and as a result there has been the possibility of shifting from a designed length.

Since the lower yoke film has to be formed distantly from the ABS in order to avoid the influence of such shifting of neck height, it has been difficult to make large the quantity of magnetism (called magnetic volume also) in a location close to the ABS. Therefore, in a conventional PMR head there has been a problem that it is difficult to have a good overwrite characteristic.

SUMMARY OF THE INVENTION

The present invention has been performed in consideration of such a problem and has as an object of it providing a thin-film magnetic head for perpendicular magnetic recording, said magnetic head being provided with a structure making it possible to an overwrite characteristic better.

In order to attain the above-mentioned object, a thin-film magnetic head for perpendicular magnetic recording according to the present invention is a thin-film magnetic head for perpendicular magnetic recording, comprising a coil for generating a magnetic field, a main magnetic pole layer for performing perpendicular magnetic recording by means of a magnetic field generated by said coil, a write shield layer facing said main magnetic pole layer with said coil between them, and a write gap layer interposed between said main magnetic pole layer and said write shield layer, wherein said main magnetic pole layer is provided with a main pole film portion and a yoke pole film portion provided on the surface of the main pole film portion facing said write shield layer, said write shield layer is located in part at a specified virtual domain, said virtual domain is a domain being determined by a virtual extended plane and a virtual perpendicular plane and being at the yoke pole film portion side with regard to said virtual extended plane and said virtual perpendicular plane, said virtual extended plane is a plane obtained by extending the surface of said yoke pole film portion facing said write shield layer, and said virtual perpendicular plane is a plane extending from the inner edge of the surface of said write shield layer facing said write gap layer perpendicularly to said virtual extended plane.

DETAILED DESCRIPTION OF THE PREFERRED EMBODIMENTS

Embodiments of a thin-film magnetic head for perpendicular magnetic recording according to the present invention are described with reference to the accompanying drawings in the following. It is assumed that in figures the same symbols show the same or corresponding parts. In the description, it is assumed that the up and down direction (thickness direction) is the upper and lower direction in the page face of FIG. 1, the width direction is the perpendicular direction to the page face of FIG. 1 and the length direction is the lateral direction in the page face of FIG. 1.

Figure 1:
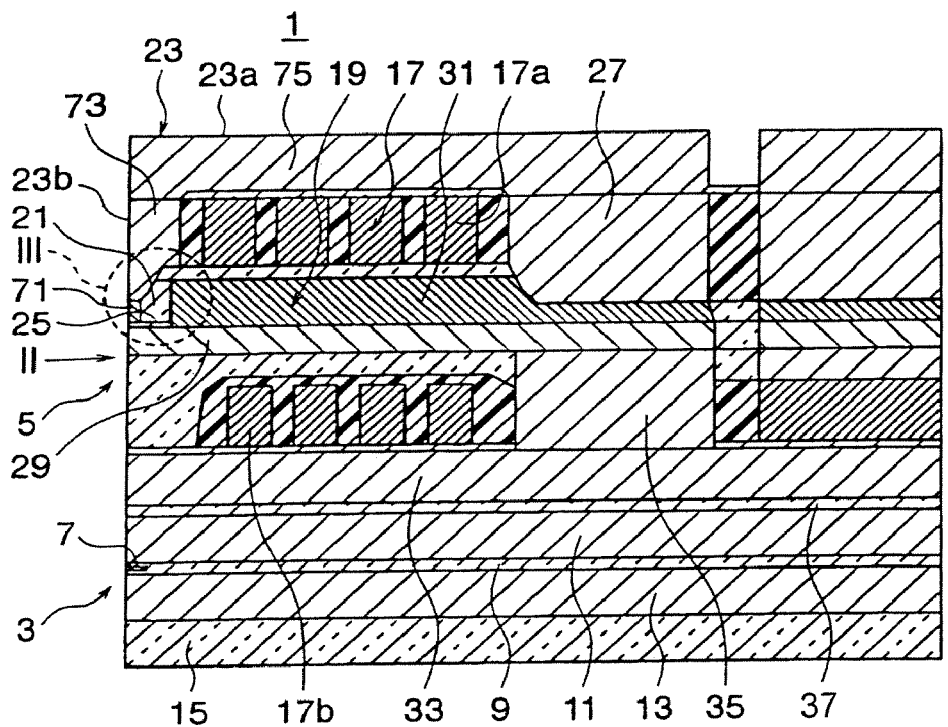
FIG. 1 is a sectional view showing a main part of a thin-film magnetic head for perpendicular magnetic recording according to the present invention, said main part being at the medium facing surface side.
Figure 2:
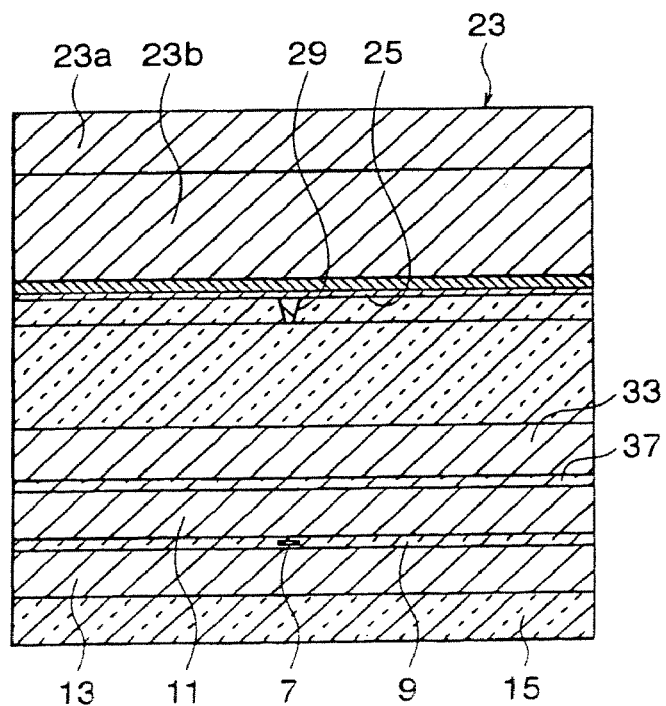
FIG. 2 is an end view of the thin-film magnetic head for perpendicular magnetic recording of FIG. 1, seen from the direction of arrow II, namely, from the medium facing surface (ABS) side.

As shown in FIGS. 1 and 2, a thin-film magnetic head 1 for perpendicular magnetic recording is provided with a read element 3 and a write element 5. The read element 3 may be a publicly known and existing magnetoresistance effect element 7 such as a spin valve element, a tunneling magnetoresistance (TMR) element and the like for example, and a detailed description of it is omitted here.

The read element 3 is buried in an insulating layer 9 formed out of $Al_2O_3$ and the like for example. The insulating layer 9 is interposed between an upper shield layer 11 and a lower shield layer 13. The upper shield layer 11 and the lower shield layer 13 are formed out of NiFe for example. The lower shield layer 13 is formed on a specific substrate 15.

The write element 5 is provided above the read element 3 in the stacking direction. The write element 5 is mainly provided with a coil 17, a main magnetic pole layer 19, a non-magnetic layer 21 and a write shield layer 23.

The coil 17 has first a first coil portion 17a provided above the main magnetic pole layer 19 in the stacking direction (film depositing direction) and a second coil portion 17b provided below the main magnetic pole layer 19 in the stacking direction (film depositing direction). The first coil portion 17a and the second coil portion 17b each are wound around an axis nearly perpendicular to the main magnetic pole layer 19, and are formed out of a conductive material such as Cu and the like.

The write shield layer 23 is provided at the opposite side to the main magnetic pole layer 19 with a part of the coil 17, namely, the first coil portion 17a between them. The write shield layer 23 has a portion 23a extending nearly in parallel with the main magnetic pole layer 19 and a portion 23b extending downward so as to come near the main magnetic pole layer 19 at its medium facing surface side end portion. The write shield layer 23 is formed out of a magnetic material such as CoNiFe and the like.

The portion 23b at the medium facing surface side of the write shield layer 23 is isolated from the main magnetic pole layer 19 with a write gap layer 25 between them. The write gap layer 25 is formed out of $Al_2O_3$ and the like for example. On the other hand, the portion 23a at the opposite side to the medium facing surface of the write shield layer 23 is connected to the main magnetic pole layer 19 by a back gap layer 27. Said first coil portion 17a is wound around this back gap layer 27. The back gap layer 27 is formed out of a magnetic material such as CoNiFe and the like.

Next, a structure of the main magnetic pole layer 19 and a portion of the write shield layer 23 being opposite to it will be described. The main magnetic pole layer 19 comprises a portion for performing perpendicular recording by means of a magnetic field generated by the coil 17, and in this embodiment, is provided with a main pole film portion 29 and an upper yoke pole film portion 31 provided on the upper surface of it. The main pole film portion 29 is formed out of a magnetic material such as CoNiFe, NiFe or the like, and the upper yoke pole film portion 31 is formed out of a magnetic material such as CoNiFe or the like.

Figure 3:
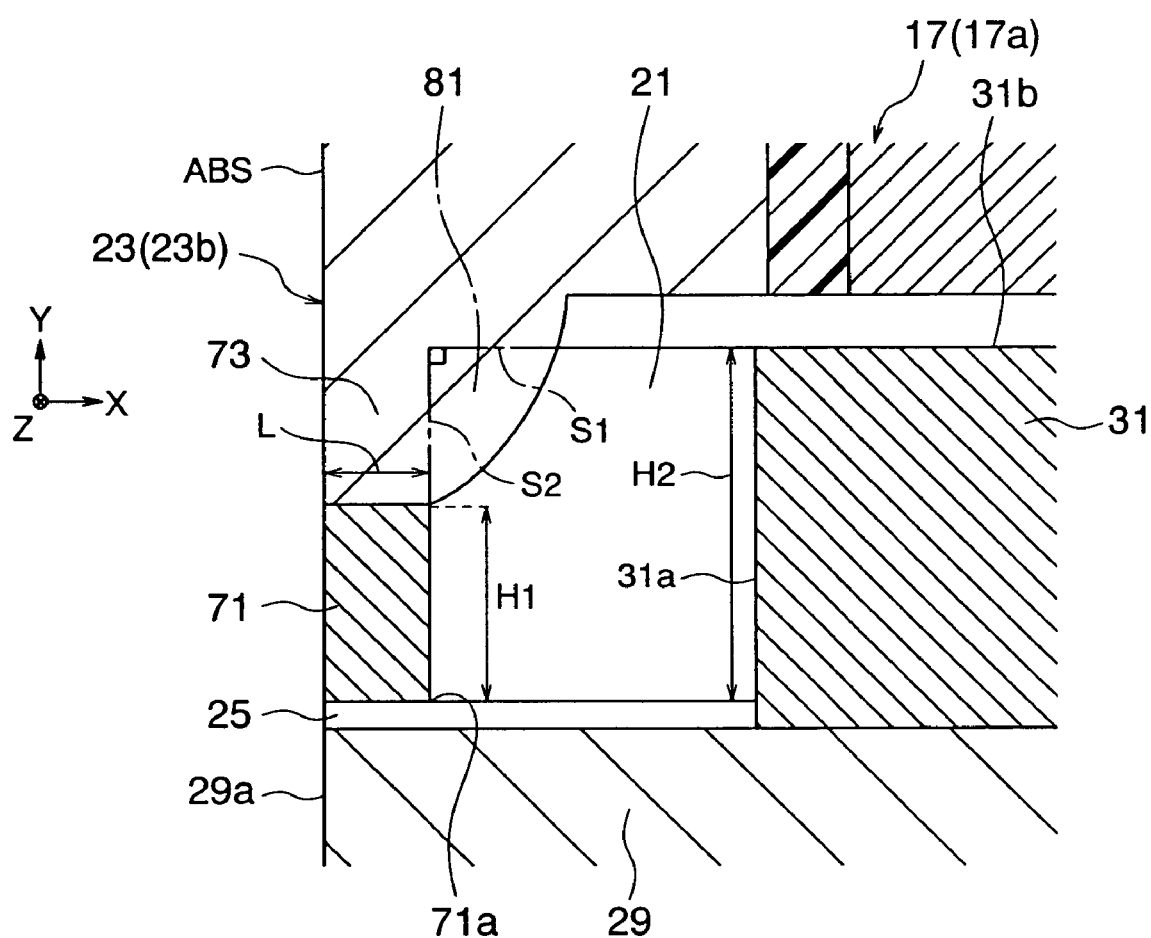
FIG. 3 is a magnified view of portion III of FIG. 1.

As shown in FIG. 3, a fore-end portion 31a at the medium facing surface (ABS) side of the upper yoke pole film portion 31 terminates at a position being more distant from the medium facing surface than a fore-end portion 29a at the medium facing surface side of the main pole film portion 29 (at a more rightward position in FIG. 1 or 3). And a non-magnetic layer 21 is provided above the main pole film portion 29 and at the medium facing surface side of the upper yoke pole film portion 31. The non-magnetic layer 21 is formed out of a non-magnetic material such as $Al_2O_3$ and the like. And the fore-end portion 29a at the medium facing surface side of the main pole film portion 29 is exposed in the medium facing surface.

As best shown in FIG. 2, the main pole film portion 29 of the main magnetic pole layer 19 is made narrower in width in comparison with the write shield layer 23 and the like (the read element 3 also is made similar). Furthermore, the main pole film portion 29 has a trapezoid-shaped end face, seen from the medium facing surface side.

The write shield layer 23 comprises a first shield film portion 71. The first shield film portion 71 is a portion located at the medium facing surface side in the vicinity of the fore-end portion 29a of the main pole film portion 29 with the non-magnetic layer 21 between them. And in this embodiment, the first shield film portion 71 is nearly constant in length (depth) L, and this length L is determined as a throat height. That is to say, the first shield film portion 71 is a portion for determining the throat height. It is assumed that symbols "X", "Y" and "Z" shown in FIG. 3 respectively indicate the length (depth) direction, the up and down direction (thickness direction) and the width direction.

And as best shown in FIG. 3, the thickness H1 of the first shield film portion 71 is smaller than the thickness H2 of the upper yoke pole film portion 31. Such a structure can be grasped as described below. The write shield layer 23 comprises a second shield film portion 73, and this second shield film portion 73 is provided over the first shield film portion 71. The length (depth) of a domain in the second shield film portion 73 facing the non-magnetic layer 21 varies in the up and down direction. Such a structure can be said to be an example in which a part of the write shield layer 23 (the second shield film portion 73) comes into a virtual domain 81 shown by alternate long and short dash lines in FIG. 3. The virtual domain 81 is a virtual domain which is defined by a virtual extended plane S1 of the upper surface 31b of the upper yoke pole film portion 31 and a virtual perpendicular plane S2 extending from the lower edge 71a in the inside (opposite side to the medium facing surface) of the first shield film portion 71 perpendicularly to the virtual extended plane S1, and is at the upper yoke pole film portion side with regard to the virtual extended plane S1 and the virtual perpendicular plane S2.

Next, a structure under the main magnetic pole layer 19 is described. Returning to FIG. 1, under the main magnetic pole layer 19, a shield layer 33 and a back gap layer 35 are provided in addition to the second coil portion 17b. These shield layer 33 and back gap layer 35 are formed out of a magnetic material such as NiFe and the like.

The shield layer 33 is stacked over the upper shield layer 11 with an insulating layer 37 interposed between them. And the back gap layer 35 connects with the shield layer 33 at a portion of the upper yoke pole film portion 31 of the main magnetic pole layer 19, said portion being at the opposite side to the medium facing surface. And the second coil portion 17b is wound around the back gap layer 35.

As the following may be said on the whole, although a thin-film magnetic head 1 for perpendicular magnetic recording is formed by repeating deposition of a plurality of layers for process reasons, layers composed of the same material may be formed at one time as one body if possible in process now and in the future. And the coil 17 may be wound around the main magnetic pole layer 19 instead of being wound around the back gap layer.

Figure 4:
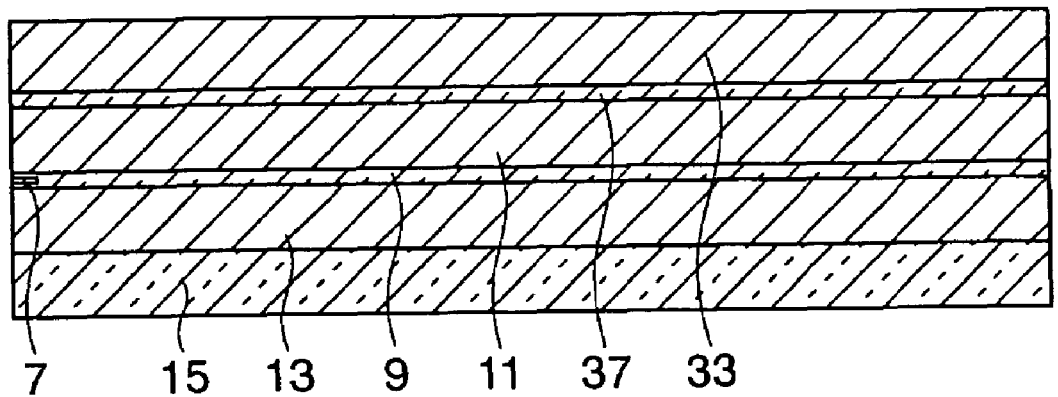
FIG. 4 is a diagram showing a process of manufacturing a thin-film magnetic head for perpendicular magnetic recording.
Figure 5:
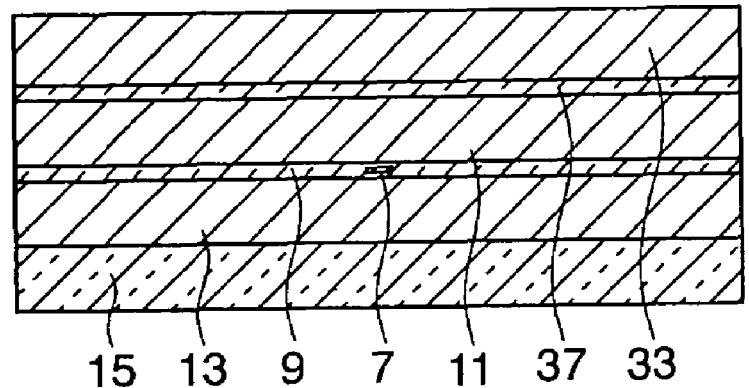
FIG. 5 is an end view of FIG. 4, seen from the ABS side.

Next, a method for manufacturing a thin-film magnetic head 1 for perpendicular magnetic recording according to the present embodiment, having a structure as described above is described. As shown in FIGS. 4 and 5, first a lower shield layer 13 of 2.0 µm in thickness is formed on a substrate 15 made of Alutech or the like for example. Next, an insulating layer 9 having a magnetoresistance effect element 7 buried in it is formed on the lower shield layer 13. In more detail, this is done in two steps, and in the first step an alumina film is formed on the upper surface of the lower shield layer 13 and then the surface of it is flattened by a chemical mechanical polishing (CMP) process. Thereafter, a magnetoresistance effect element 7 is formed and in the second step an alumina film to cover the magnetoresistance effect 7 is formed.

Next, an upper shield layer 11 of 1.5 µm in thickness is formed on the insulating layer 9, on which an insulating layer 37 is formed, and on it a shield layer 33 of 1.5 µm in thickness is formed. FIGS. 4 and 5 show the stage in which the formation of such a shield layer 33 has ended.

Figure 6:
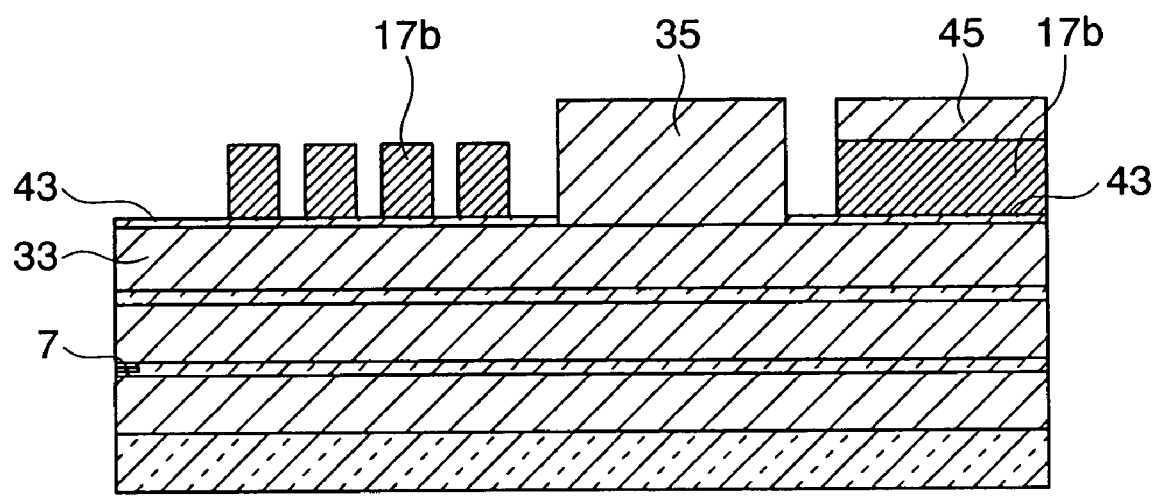
FIG. 6 is a diagram showing a process next to FIGS. 4 and 5.

Subsequently, as shown in FIG. 6, a second coil portion is formed. First, an insulating film 43 is formed in a wider area on the upper surface of the shield layer 33 than an area required for forming a second coil portion 17b. Further, a seed film is formed so as to cover the upper surface of this insulating film 43 and exposed portions of the shield layer 33. The formation of this seed film can be performed by a thin film forming method such as a chemical vapor deposition (CVD) and the like.

Then, a photoresist film is formed on the seed film by means of a spin coating method and the like, and thereafter is exposed using a mask having a coil pattern and is developed. Thereby, a resist frame having a specified pattern is formed. The photoresist film may be either a positive photoresist or a negative photoresist. And a second coil portion 17b is grown to become 2.0 µm in thickness on the seed film being present inside the coil forming pattern by performing a Cu-plating process.

Next, a resist frame is formed by performing a photolithography process for forming a back gap layer 35 and a magnetic layer 45. And by performing a plating process, the back gap layer 35 is grown on the shield layer 33 and the magnetic layer 45 is grown on the second coil portion 17b at the opposite side to the medium facing surface with the back gap layer 35 between them. Then the resist frame is removed by means of a chemical etching process and the like. Thereby, the state of FIG. 6 is obtained. The magnetic layer 45 is formed out of a magnetic material such as NiFe and the like.

Figure 7:
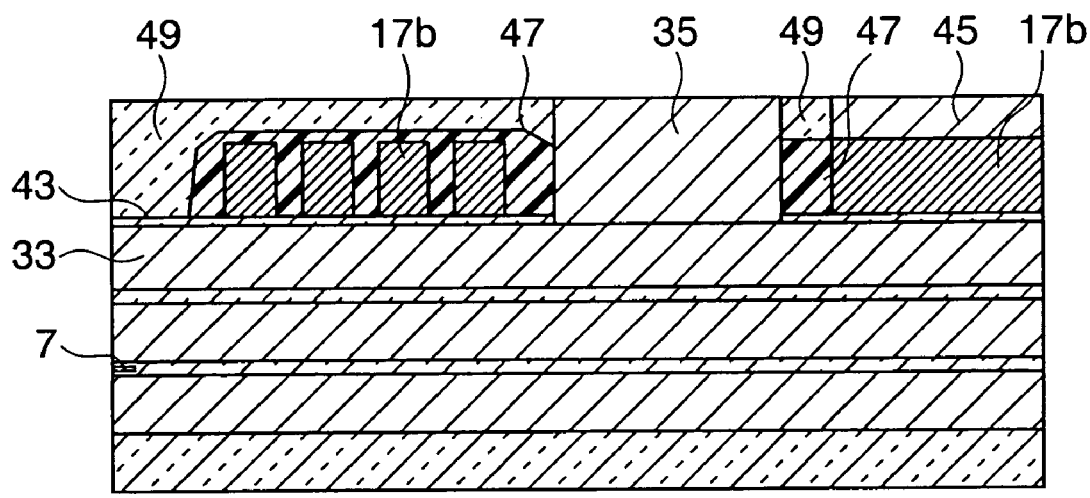
FIG. 7 is a diagram showing a process next to FIG. 6.
Figure 8:
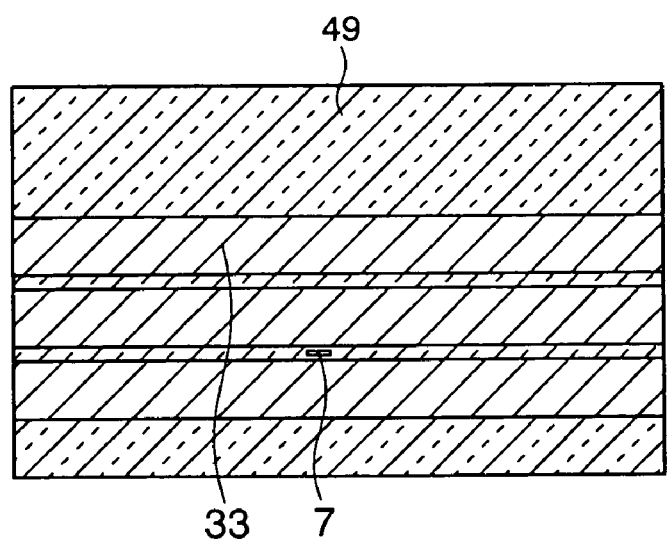
FIG. 8 is an end view of FIG. 7, seen from the ABS side.

Next, as shown in FIGS. 7 and 8, a photoresist film 47 is formed so as to cover the second coil portion 17b, and a part between the back gap layer 35 and the second coil portion 17b (at the opposite side to the medium facing surface with the back gap layer 35 between them). Further, a non-magnetic film 49 is formed so as to cover the photoresist film 47. The non-magnetic layer 49 is formed out of $Al_2O_3$ for example. After this, the state shown in FIGS. 7 and 8 is obtained by flattening the whole surface through performing a CMP process until the thickness of the back gap layer 35 becomes about 3.0 µm.

Figure 9:
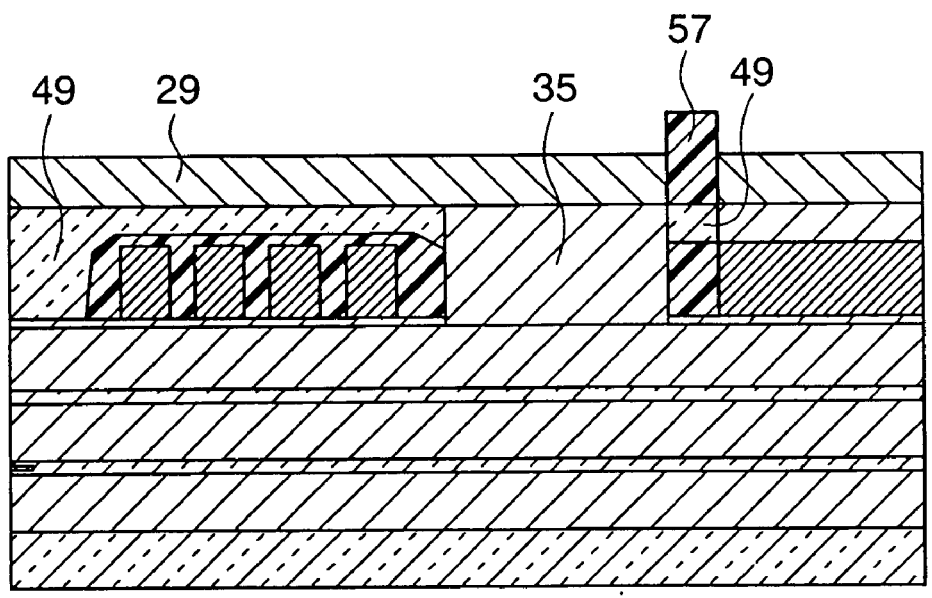
FIG. 9 is a diagram showing a process next to FIGS. 7 and 8.
Figure 10:
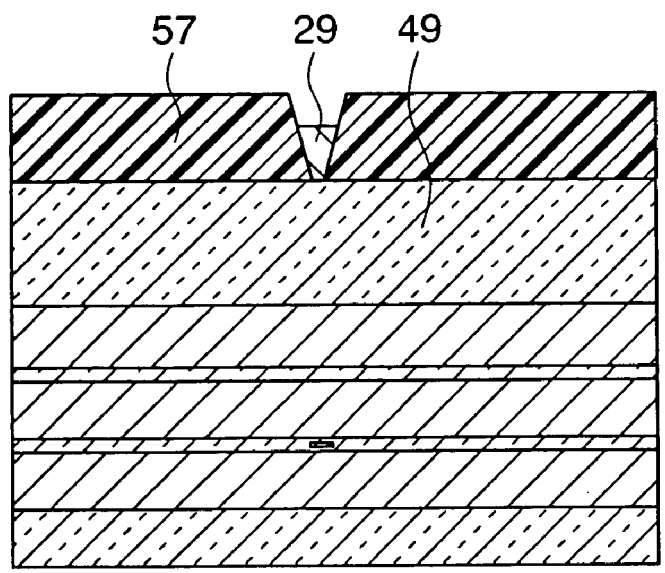
FIG. 10 is an end view of FIG. 9, seen from the ABS side.

Next, a main pole film portion 29 is formed. A plating seed film not illustrated is provided in a domain in which a main pole film portion 29 is to be formed on the upper surface flattened by the above-mentioned CMP process. Additionally on it, as shown in FIGS. 9 and 10, a photoresist film 57 for forming the main pole film portion is formed. And the main pole film portion 29 is formed by performing a plating process using the photoresist film 57 as a resist frame.

Figure 11:
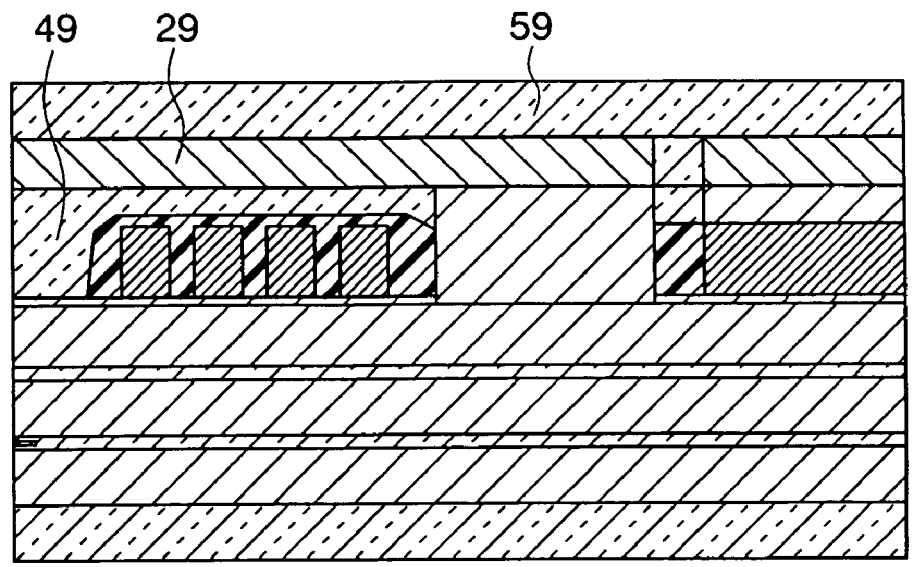
FIG. 11 is a diagram showing a process next to FIGS. 9 and 10.
Figure 12:
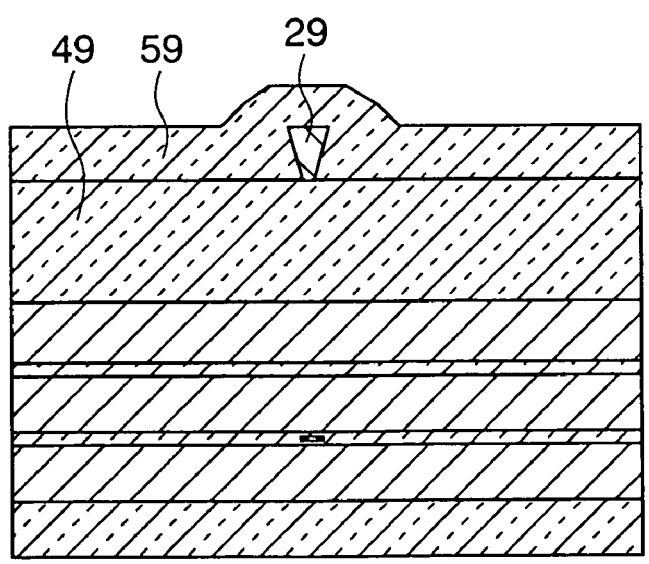
FIG. 12 is an end view of FIG. 11, seen from the ABS side.
Figure 13:
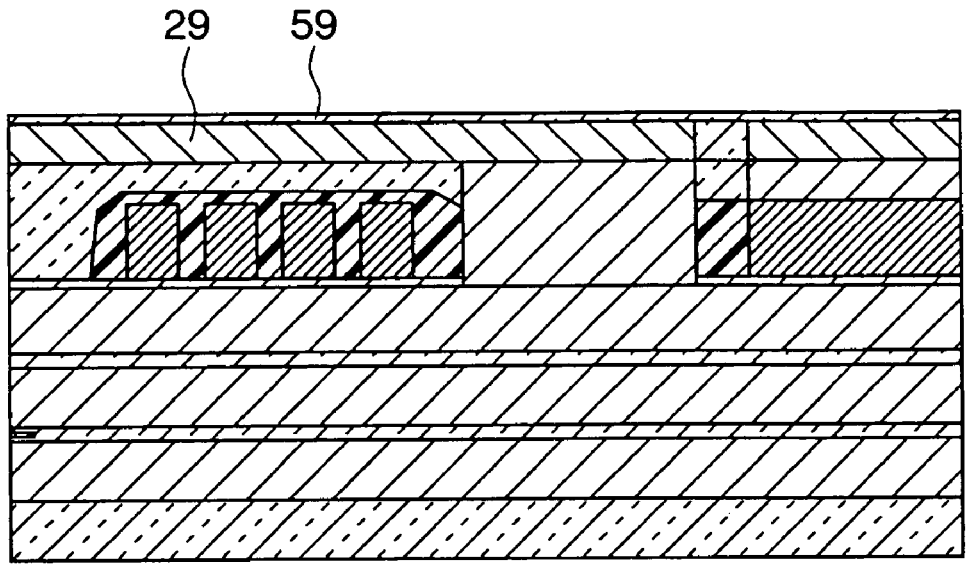
FIG. 13 is a diagram showing a process next to FIGS. 11 and 12.
Figure 14:
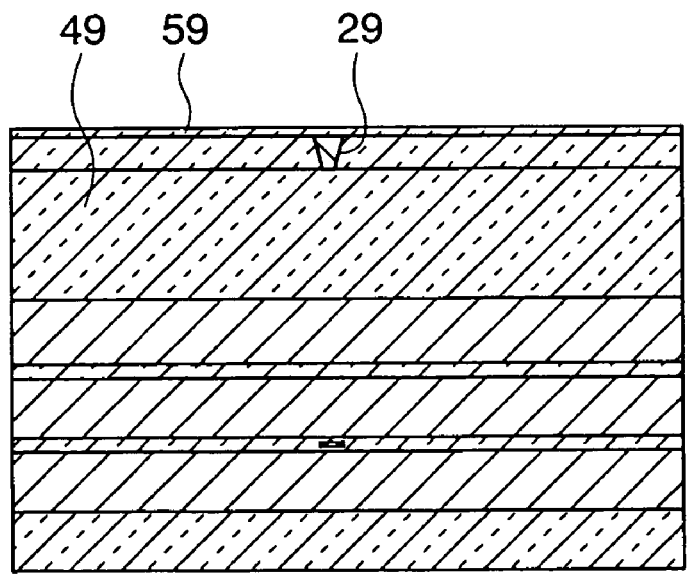
FIG. 14 is an end view of FIG. 13, seen from the ABS side.

As shown in FIGS. 11 and 12, after the photoresist film 57 for forming the main pole film portion is removed, a non-magnetic layer 59 is formed so as to cover the main pole film portion 29 and the non-magnetic layer 49. Furthermore, as shown in FIGS. 13 and 14, the non-magnetic layer 59 is made into a thin film by performing a CMP process on it.

Figure 15:
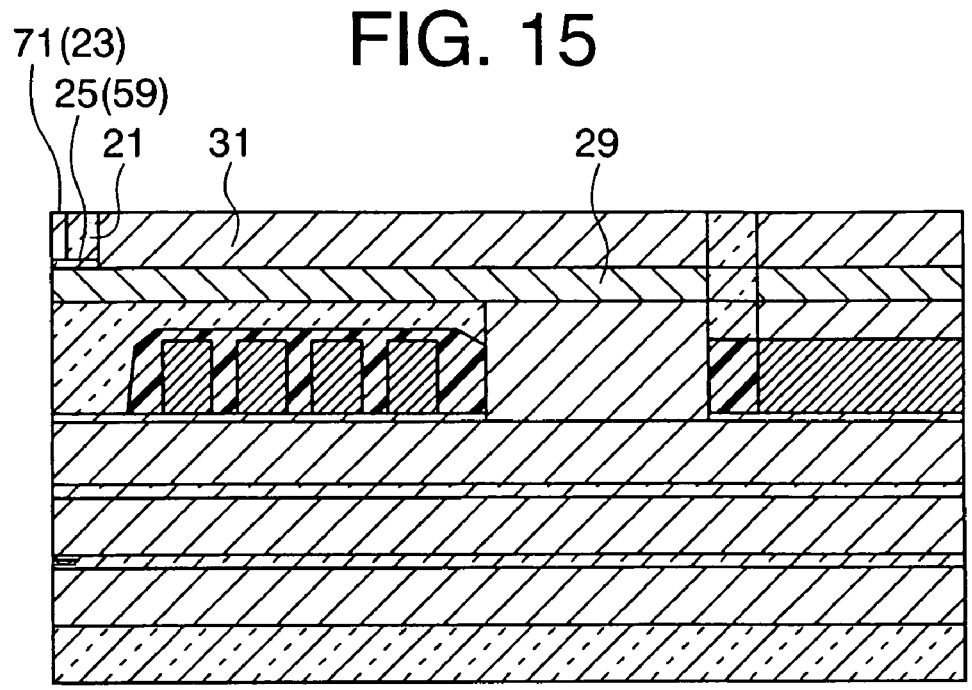
FIG. 15 is a diagram showing a process next to FIGS. 13 and 14.
Figure 16:
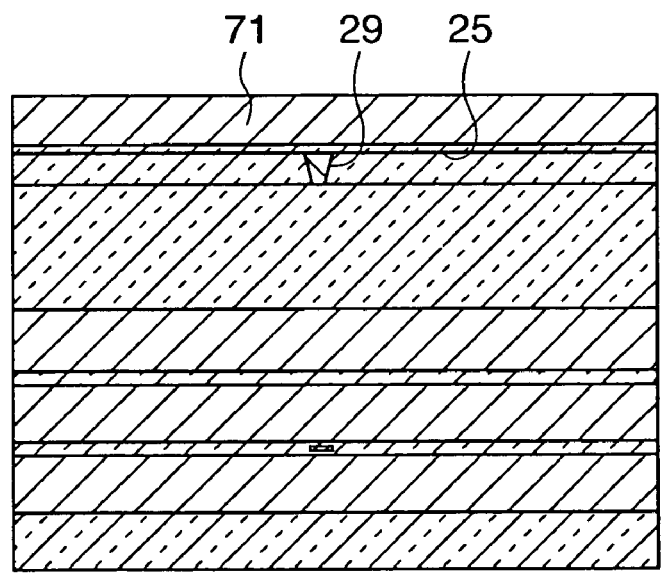
FIG. 16 is an end view of FIG. 15, seen from the ABS side.

Next, as shown in FIGS. 15 and 16, first only a specified depth portion of the thinned non-magnetic layer 59 from the medium facing surface is left and the other portion is removed, and thereby a write gap layer 25 is formed. Additionally an upper yoke pole film portion 31 and a first shield film portion 71 for forming a write shield layer 23 are formed. The yoke pole film portion 31 is provided on the upper surface of the main pole film portion 29 having no write gap layer 25 formed on it. And the first shield film portion 71 is formed on the upper surface of the write gap layer 25 so as to be isolated by a specified distance from the fore-end portion of the upper yoke pole film portion 31 at the medium facing surface side. Further, a non-magnetic layer 21 is provided between the first shield film portion 71 and the upper yoke pole film portion 31, and thereby the state shown in FIGS. 15 and 16 is obtained.

Figure 17:
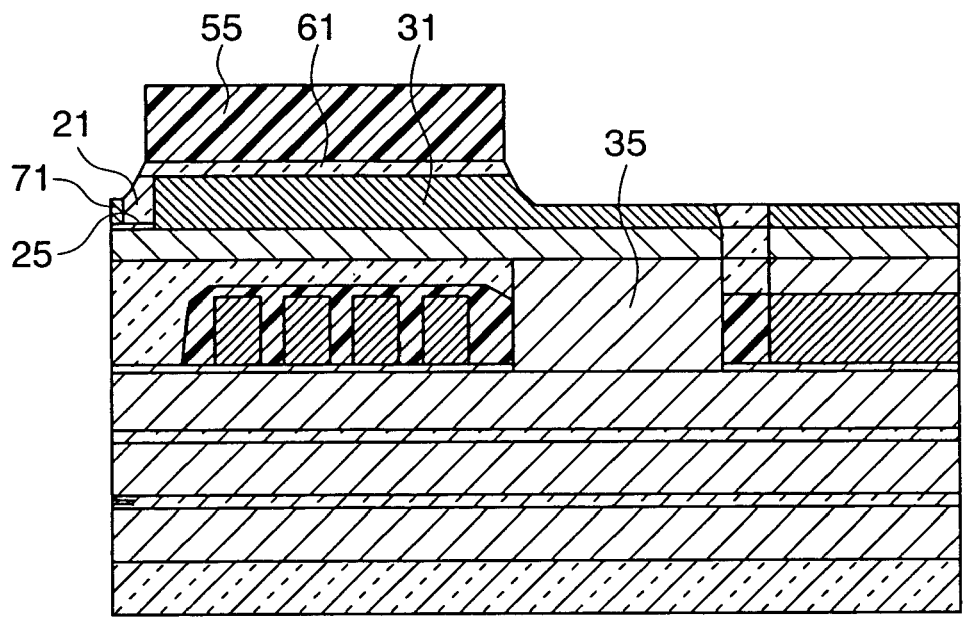
FIG. 17 is a diagram showing a process next to FIGS. 15 and 16.

Next, a process to the state shown in FIG. 17 is described. First, an insulating layer 61 is formed on the upper surfaces of the upper yoke pole film portion 31, the non-magnetic layer 21 and the first shield film portion 71. This insulating layer 61 is a layer to be the foundation of a first coil portion 17a later on. Next, a photoresist film 55 is provided partially on the upper surface of the insulating layer 61. The end portion of the photoresist film 55 at the medium facing surface side is set nearly at the same position as the fore-end portion of the upper yoke pole film portion 31 at the medium facing surface side. The end portion of the photoresist film 55 at the opposite side to the medium facing surface is set nearly at the same position as the end portion of the back gap layer 35 at the medium facing surface side. Such an end portion position of the photoresist film 55 illustrated is simply an example, and can be altered properly according to circumstances such as the thickness of the first shield film portion 71 to be set, the state of an etching process described later, and the like.

Next, the state shown in FIG. 17 is obtained by etching the insulating layer 61, the upper yoke pole film portion 31, the non-magnetic layer 21 and the first shield film portion 71 through performing a reactive ion etching (RIE) process and then an ion beam etching (IBE) process using the photoresist film 55 as a mask. That is to say, as described above, such processes make the thickness of the first shield film portion 71 smaller than the thickness of the upper yoke pole film portion 31.

Figure 18:
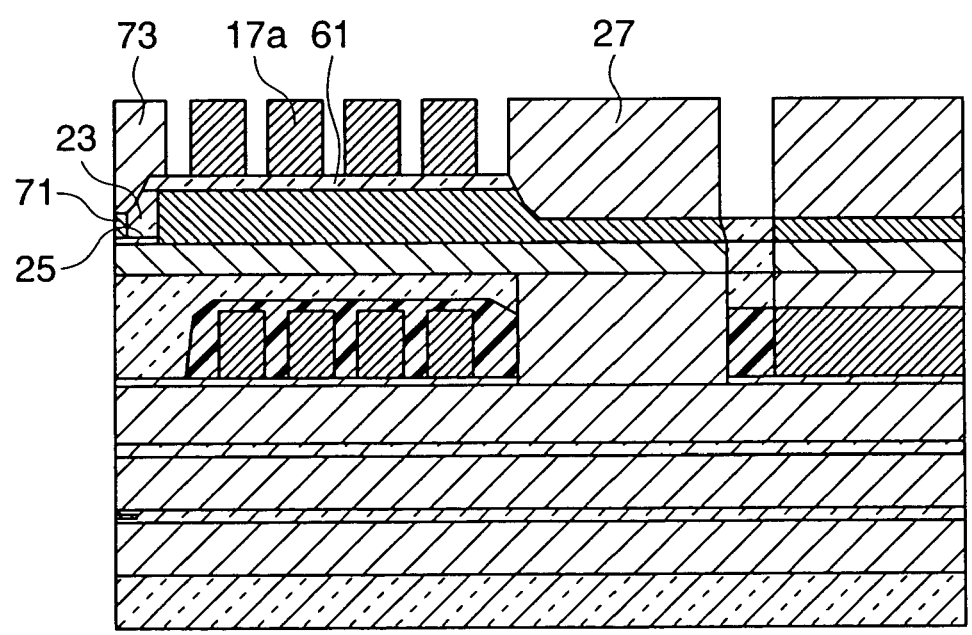
FIG. 18 is a diagram showing a process next to FIG. 17.

Next, as shown in FIG. 18, the photoresist film 55 is removed and a first coil portion 17a is formed on the upper surface of the insulating layer 61 according to a similar procedure to the formation of the second coil portion 17b. And a second shield film portion 73 to be a component of the write shield layer 23 is formed at the medium facing surface side of the first coil portion 17a. The second shield film portion 73 is provided so as to cover the first shield film portion 71 and the non-magnetic layer 21. And a back gap layer 27 is formed at the opposite side of the first coil portion 17a to the medium facing surface.

Further, after this a photoresist film is provided between the Cu layer of the first coil portion 17a and the magnetic layer, and is covered with an insulating layer made of Al$_2$O$_3$ and the like and then a third shield film portion 75 is formed, and thereby a write shield layer 23 is completed and thus the state shown in FIGS. 1 and 2 is obtained.

In a thin-film magnetic head 1 for perpendicular magnetic recording formed as described above, since the thickness of the first shield film portion 71 is smaller than the thickness of the upper yoke pole film portion 31, it is possible to earn the magnetic volume and improve the overwrite characteristic by relatively thickening the upper yoke pole film portion 31. Furthermore, even if the magnetic volume of the upper yoke pole film portion 31 is increased in order to improve the overwrite characteristic in such a way, since the first shield film portion 71 being a domain which is liable to be saturated with magnetism is made small, it is possible to suppress undesirable magnetic leakage. And since the second shield film portion 73 provided over the first shield film portion 71 is made closer to the upper yoke pole film portion 31 than the first shield film portion 71, it is possible to force leaked magnetic flux to be absorbed by the second shield film portion 73 being more difficult to be magnetically saturated rather than to flow through the first shield film portion 71.

The present invention is not limited to the above-mentioned embodiment but can be altered in the following for example.

Figure 19:
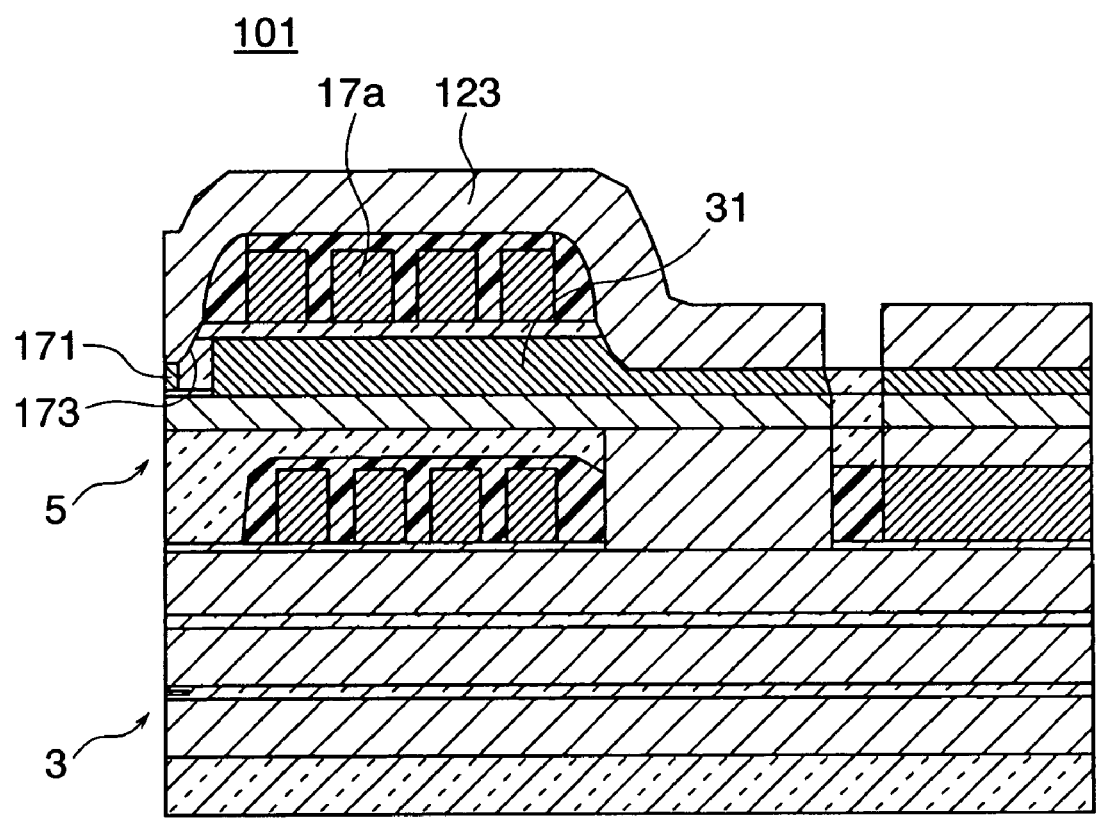
FIG. 19 is a similar view to FIG. 1 according to another embodiment of the present invention.

First, the present invention is not limited to the above-described embodiment with respect to the structure of a write shield layer. As shown in FIG. 19, the present invention can be also implemented as a thin-film magnetic head 101 for perpendicular magnetic recording, being provided with a write shield layer 123 having a shape in which a part covering a first coil portion 17a and the vicinity of the part swell upward.

In such a thin-film magnetic head 101 for perpendicular magnetic recording also, since the thickness of a first shield film portion 171 is smaller than the thickness of an upper yoke pole film portion 31, it is possible to earn the magnetic volume and improve the overwrite characteristic, and furthermore, since a domain being liable to be saturated with magnetism is made small, it is possible to suppress undesirable magnetic leakage. And it is possible to force leaked magnetic flux to be absorbed by a second shield film portion 173 rather than to flow through the first shield film portion 171.

Although the contents of the present invention have been concretely described with reference to the preferred embodiments as described above, it is self-evident for people in this field to be capable of adopting additional variations and modifications on the basis of the basic technical ideas and teachings of the present invention.

What is claimed is:

1. A thin-film magnetic head for perpendicular magnetic recording, comprising;
    a medium facing surface;
    a coil for generating a magnetic field;
    a main magnetic pole layer for performing perpendicular magnetic recording by means of a magnetic field generated by said coil;
    a write shield layer facing said main magnetic pole layer with said coil between them; and
    a write gap layer interposed between said main magnetic pole layer and said write shield layer, wherein
    said main magnetic pole layer is provided with a main pole film portion and a yoke pole film portion provided on the surface of the main pole film portion facing said write shield layer,
    said write shield layer is located in part at a specified virtual domain and has a varying depth inside the specified virtual domain,
    said virtual domain is a domain being determined by a virtual extended plane and a virtual perpendicular plane and being at a yoke pole film portion side with regard to said virtual extended plane and said virtual perpendicular plane,
    said virtual extended plane is a plane obtained by extending a surface of said yoke pole film portion facing said write shield layer and perpendicular to the medium facing surface, and
    said virtual perpendicular plane is a plane extending from an inner surface of a first shield film portion of said write shield layer that is coupled to said write gap layer and parallel to and separate from the medium facing surface.

2. A thin-film magnetic head for perpendicular magnetic recording according to claim 1, wherein
    said first shield film portion determines a throat height at a position facing said main pole film portion with said write gap layer between them, and
    a thickness of said first shield film portion is smaller than a thickness of said yoke pole film portion, wherein thickness is measured in a direction parallel to the medium facing surface.

3. A thin-film magnetic head for perpendicular magnetic recording according to claim 1, wherein
    said first shield film portion has a nearly constant depth at a position facing said main pole film portion with said write gap layer between them, and
    the thickness of said first shield film portion is smaller than the thickness of said yoke pole film portion, wherein thickness is measured in a direction parallel to the medium facing surface.

4. A thin-film magnetic head for perpendicular magnetic recording according to claim 1, wherein the portion of the write shield layer located in part at the specified virtual domain is convex in relation to the specified virtual domain.

5. A thin-film magnetic head for perpendicular magnetic recording according to claim 1, wherein the portion of the write shield layer having a varying depth inside the specified virtual domain interfaces a non-magnetic layer in the specified virtual domain.

6. A thin-film magnetic head for perpendicular magnetic recording according to claim 1, wherein the portion of the write shield layer having a varying depth inside the specified virtual domain is formed by etching a non-magnetic layer in the virtual domain to have a concave shape.

7. A thin-film magnetic head for perpendicular magnetic recording, comprising;

a medium facing surface;

a coil for generating a magnetic field;

a main magnetic pole layer for performing perpendicular magnetic recording by means of a magnetic field generated by said coil;

a write shield layer facing said main magnetic pole layer with said coil between them; and a write gap layer interposed between said main magnetic pole layer and said write shield layer, wherein said main magnetic pole layer is provided with a main pole film portion and a yoke pole film portion provided on the surface of the main pole film portion facing said write shield layer, said write shield layer is located in part at a specified virtual domain, said virtual domain is a domain being determined by a virtual extended plane and a virtual perpendicular plane and being at a yoke pole film portion side with regard to said virtual extended plane and said virtual perpendicular plane, said virtual extended plane is a plane obtained by extending a surface of said yoke pole film portion facing said write shield layer and perpendicular to the medium facing surface, and said virtual perpendicular plane is a plane extending from an inner surface of a first shield film portion of said write shield layer that is coupled to said write gap layer and parallel to and separate from the medium facing surface, and a thickness of said first shield film portion is smaller than a thickness of said yoke pole film portion, wherein thickness is measured in a direction parallel to the medium facing surface.

* * * * *